United States Patent
Chandar et al.

(10) Patent No.: US 7,149,723 B2
(45) Date of Patent: Dec. 12, 2006

(54) SYSTEM AND METHOD FOR DETERMINING COMPUTER ACCESS WITH ELECTRONIC PAYMENT MECHANISM

(75) Inventors: Ravi Chandar, Boise, ID (US); Makarand Madhukar Jogalekar, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 09/895,760

(22) Filed: Jun. 29, 2001

(65) Prior Publication Data
US 2003/0004886 A1    Jan. 2, 2003

(51) Int. Cl.
  *G06H 17/60* (2006.01)
(52) U.S. Cl. .............. 705/67; 705/1; 705/51; 705/54; 705/59; 713/155; 713/165; 713/166; 713/193; 380/231
(58) Field of Classification Search .......... 705/51, 705/67, 1, 54, 59; 713/155, 165, 166, 193; 380/231
  See application file for complete search history.

(56) References Cited

U.S. PATENT DOCUMENTS

| | | | |
|---|---|---|---|
| 4,439,636 A | 3/1984 | Newkirk et al. | |
| 4,672,661 A | 6/1987 | Clark, Jr. et al. | |
| 4,920,432 A * | 4/1990 | Eggers et al. | 386/96 |
| 5,008,928 A | 4/1991 | Cleghorn | |
| 5,155,680 A * | 10/1992 | Wiedemer | 705/52 |
| 5,602,905 A | 2/1997 | Mettke | |
| 5,729,591 A | 3/1998 | Bailey | |
| 5,812,765 A | 9/1998 | Curtis | |
| 5,859,416 A | 1/1999 | Gatto | |
| 6,604,087 B1 * | 8/2003 | Kolls | 705/14 |

FOREIGN PATENT DOCUMENTS

JP    2004258829    *  9/2004

OTHER PUBLICATIONS

;http://www. rohan.sdsu.edu/~infosys/ist/resource/stdlabs.pdf, date unknown, author unknown.*

* cited by examiner

*Primary Examiner*—John M. Winter

(57) ABSTRACT

A method of public access computing comprises providing a computer system for accessing computer software applications, and selectively permitting access to the computer system with an electronic payment mechanism. A selective access computer system comprises a computing workstation having at least one software application and a selective access mechanism connected to the workstation. The selective access mechanism is configured for obtaining electronic payment authorization for a user's financial instrument and for permitting selective access to the computer workstation upon payment authorization for the user.

4 Claims, 3 Drawing Sheets

US 7,149,723 B2

SYSTEM AND METHOD FOR DETERMINING COMPUTER ACCESS WITH ELECTRONIC PAYMENT MECHANISM

THE FIELD OF THE INVENTION

The present invention relates to computer access systems, and in particular, to computer systems with selective access controlled by electronic payment mechanisms.

BACKGROUND OF THE INVENTION

Technology has revolutionized our lives by simplifying many tasks for us. Moreover, with miniaturization, we take computers wherever we go in the form of notebook computers, personal digital assistants, and other techno gadgets. With these devices, we can take personal or business information with us to almost any location for access at our convenience.

This technological revolution has produced an information age in which all types and volumes of information are widely available. Accordingly, most of us expect that all business and/or personal information should be available to them anywhere and at anytime. Network communications, such as the internet and World Wide Web, facilitate this seemingly limitless ability to deliver and obtain information.

Nevertheless, computer users still sometimes find themselves in places without their desktop or notebook computer, or without their personal digital assistant. Unfortunately, this situation might arise when the computer user has extra time on their hands, such as waiting at an airport or a retail shopping center. When properly equipped, people can use this otherwise lost time for making telephone calls, checking email, other communication tasks, or computing tasks. However, without a mobile phone or notebook computer, this time is wasted.

Some public venues such as airports provide business suites with telephones and even capability for internet communications including email. Nevertheless, these services tend to be quite limited. Moreover, all of these arrangements create issues of access and control regarding who is using these devices, how the services are paid for, and how to protect the devices from unauthorized use. Accordingly, many computer users still yearn for complete freedom to compute and electronically communicate in public settings, such as an airport, just as they would at home or at work.

SUMMARY OF THE INVENTION

A method of public access computing of the present invention comprises providing a computer system for accessing computer software applications, and selectively permitting access to the computer system with an electronic payment mechanism.

A selective access computer system of the present invention comprises a computing workstation having at least one software application and a selective access mechanism connected to the workstation. The selective access mechanism is configured for obtaining electronic payment authorization for a user's financial instrument and for permitting selective access to the computer workstation upon payment authorization for the user.

DESCRIPTION OF THE PREFERRED EMBODIMENTS

Figure 1:
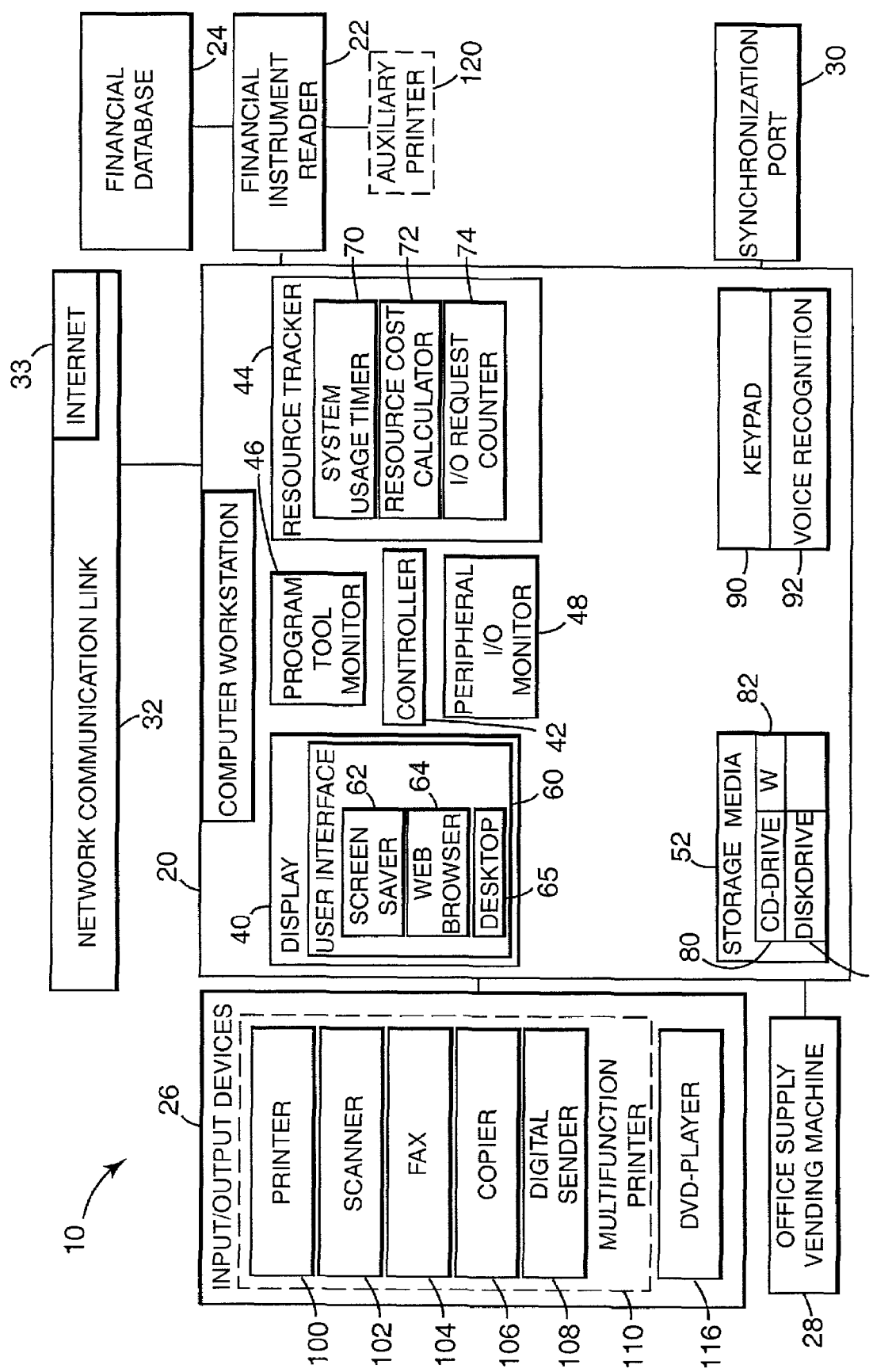
FIG. 1 is a block diagram of a public access computing system, according to one embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Components of the present invention may be implemented in hardware via a microprocessor, programmable logic, or state machine, in firmware, or in software within a given device. In one aspect, at least a portion of the software programming is web-based and written in HTML and JAVA programming languages, including links to graphical user interfaces, such as via windows-based operating system. The components may communicate via a network using a communication bus protocol. For example, the present invention may or may not use a TCP/IP protocol suite for data transport. Other programming languages and communication bus protocols suitable for use with the present invention will become apparent to those skilled in the art after reading the present application. Components of the present invention may reside in software on one or more computer-readable media. The term computer-readable media as used herein is defined to include any kind of memory, volatile or non-volatile, such as floppy disks, hard disks, CD-ROMs, flash memory, read-only memory (ROM), and random access memory (RAM).

Preferably, the user interfaces described herein run on a controller, computer, appliance or other device having an operating system which can support one or more applications. The operating system is stored in memory and executes on a processor. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which allow the user to enlarge or shrink the application or document relative to the display screen. Each window can act independently, including its own menu, toolbar, pointers, and other controls, as if it were a virtual display device. Other software tools may be employed via the window, such as a spreadsheet for collecting data. The operating system preferably includes a windows-based dynamic display which allows for the entry or selection of data in dynamic data field locations via an input device such as a keyboard and/or mouse. One preferred operating system is a Windows® brand operating system sold by Microsoft Corporation. However, other operating systems which provide windowing environments may be employed, such as those available from Apple Corporation or IBM. In another embodiment, the operating system does not employ a windowing environment.

A selective access computing system and method of the present invention enables a member of the public to privately use a computer system for a fee. The computer system preferably is located in a kiosk of an airport or retail shopping center, or private suite in a business setting or hotel. The fee is paid through an electronic payment mechanism such as an electronic credit card reader. To insure that only paying customers use the computer system, the computer system operates in a locked mode until the computer system receives a signal from the electronic payment mechanism that the customer has payment authorization to use the computer system. In this locked mode, a screen saver on a display of the computer system informs prospective customers of services available from the computer system. Upon payment authorization, a user interface desktop is revealed and the customer uses the computer system including software applications (desktop or web-based), input/output devices such as a printer, scanner, and storage media devices, such as a disk drive.

When a customer is done using the computer system, then the customer is electronically charged a fee corresponding to the time of use and/or extent of use the software applications and input/output devices. Finally, upon the customer's termination from the computer system, the computer system returns to the locked mode with display of the screen saver until the next paying customer activates the computer system.

A selective access computing system and method according to the present invention is illustrated generally at 10 in FIG. 1. System 10 includes computer workstation 20, financial instrument reader 22, financial database 24, input/output devices 26, office supply vending machine 28, and synchronization port 30. Computer workstation 20 includes display 40, controller 42, resource tracker 44, program tools monitor 46, peripherals monitor 48, and storage media devices 52. Display 40 comprises user interface 60 including screen saver 62, web browser 64, and desktop 65. Resource tracker 44 includes system usage timer 70, resource cost calculator 72, and input/output (I/O) request counter 74. Storage media devices 52 include CD drive 80 with write capability 82, and disk drive 84. Computer workstation 20 also includes additional input devices including keypad 90 and voice recognition device 92, which are used for entering data into computer workstation 20 and/or for manipulating operating system 10.

Input/output devices 26 include printer 100, scanner 102, fax 104, copier 106, digital sender 108, and DVD player 116. One or more of these devices optionally are incorporated into a single device 110 such as a multifunction printer. Using the well known features of these devices 26, an authorized user either produces an output from computer workstation 20, such as a printed page from printer 100, or a facsimile message sent from fax 104, or receives an input into computer workstation 20, such as an imaged paper from scanner 102. Synchronization port 30 permits docking a portable computing device to computer workstation 20 for exchanging data.

Network communication link 32, as used herein, includes an internet communication link (e.g., the Internet), an intranet communication link, or similar high-speed communication link. In one preferred embodiment, network communication link 32 includes an Internet communication link 33. Network communication link 32 facilitates communication between computer workstation 20 and network-provided software applications such as application service providers.

Controller 42 of computer workstation 20 includes hardware, software, firmware or combination of these. In one preferred embodiment, controller 42 includes a computer server or other microprocessor based system capable of performing a sequence and logic operations.

Display 40 of computer workstation 20 preferably includes a video monitor that displays user interface 60. User interface 60 comprises a graphical interface through which a user can interact with program tools monitor 46 and peripherals monitor 48. Screen saver 62 of user interface 60 appears on display 40 when computer workstation 20 is not in use for an extended period of time, and/or when system 10 prevents unauthorized access to computer workstation 20. Screen saver 62 appears as an informational or decorative screen on display 40. Web browser 64 comprises any well-known network browser such as Internet Explorer® or Netscape Navigator® that is used to navigate the internet including the World Wide Web. Web browser 64 is available to authorized users of computer workstation 20 for internet computing.

Desktop 65 comprises a graphical interface for allowing the user to access and operate various software and hardware features of computer workstation 20 when system 10 is in an unlocked mode. Accordingly, for a system administrator, desktop 65 displays access for setup and maintenance of all features of computer workstation 20. On the other hand, for authorized clients, desktop 65 only displays access to select software applications through program tools monitor 46, input/output devices 26 through peripherals monitor 48, and storage media devices 52.

Resource tracker 44 of computer workstation 20 includes system usage timer 70, resource cost calculator 72, and input/output request counter 74. System usage timer 70 comprises a module that tracks the total amount of time that an authorized user uses system 10 so that the user can be charged for the time of use. Input/output request counter 74 comprises a module that tracks the number of requests by user to use input/output devices 26 so that the user can be charged for use of each input/output devices 26, such as printer 100, scanner 102, fax 104, copier 106, digital sender 108, and DVD player 116. Resource cost calculator 72 comprises a module that communicates with system usage timer 70 and input/output request counter 74 for determining the total cost of the use of system 10 by an authorized user.

Program tools monitor 46 of computer workstation 20 comprises a collection of one or more software applications that are available to authorized users of system 10 and includes a usage tracker for tracking which software applications are used by each user. Peripherals monitor 48 comprises a module that controls each input/output device 26 and tracks which input/output devices are used by each authorized user.

Storage media devices 52 of computer workstation 20 include CD drive 80 with write capability 82 and disk drive 84. Storage media device 52 permits an authorized user to export or save data produced during use of computing workstation 20 onto a diskette or CD, and/or to import or retrieve data from a CD or diskette into computer workstation 20 for use in one of the software applications available through program tools monitor 46.

Financial instrument reader 22 comprises any device capable of reading a financial instrument (e.g., credit card, check, etc.) with an electronically readable code or identification and communicating with financial database 24 for determining if the financial instrument is valid and in good standing, as well as for requesting that a charge be applied against the financial instrument. For example, financial instrument reader 22 preferably comprises a credit card/debit card reader that performs these functions by electronically reading an magnetic code on the back of the card and then using a phone line to communicate with financial database 24. Financial database 24 preferably comprises a financial institution and/or financial services network that electronically carry out the financial transaction with financial instrument. Financial instrument reader 22 is in communication with computer workstation 20 so that financial instrument reader 22 receives an amount to be charged to a financial instrument and so that financial instrument reader 22 can send a signal to computer workstation 20 that a potential user has received payment authorization with their financial instrument.

Figure 2:
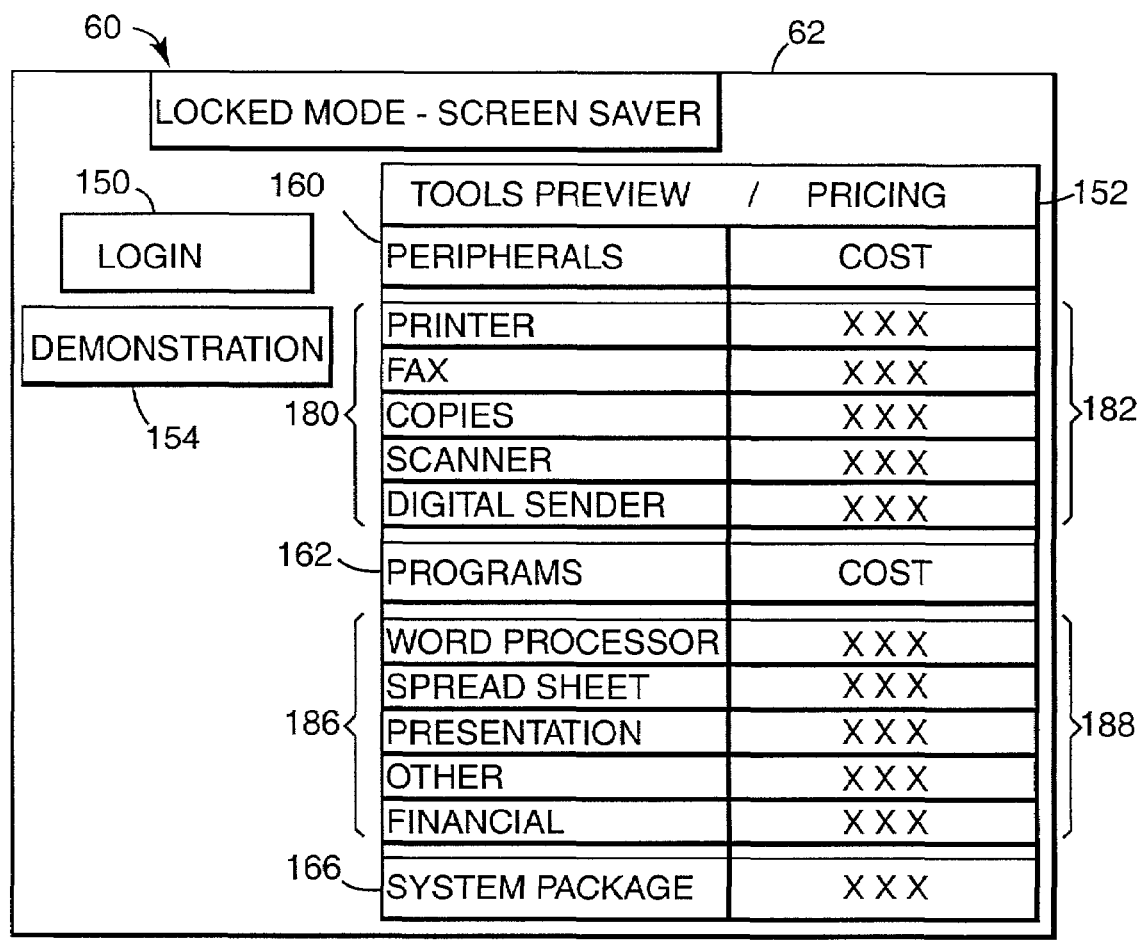
FIG. 2 is a block diagram of a locked user interface of a public access computing system, according to one embodiment of the present invention.

As shown in FIG. 2, user interface 60 of display 40 includes screen saver 62. Screen saver appears on display 60 when system 10 is in a locked mode and prevents unauthorized access to system 10 while simultaneously providing information to prospective customers about the services of system 10. Screen saver 62 includes login function 150, tools preview/pricing function 152, and demonstration function 154. Tools function 152 includes peripherals listing 160, programs listing 162 and system package listing 166. Tools preview/pricing function 152 provides a listing of all software application and peripheral input/output devices available for use with system 10, as well as an associated cost for use of each software application and/or device.

Login function 150 permits an authorized user to login with their name or an account number. The account number is used to identify the authorized user and optionally is used for billing purposes to electronically debit a financial instrument of the user that is already known to system 10 through a prior contact with the user. In this arrangement, the user need not swipe their financial instrument through reader 22 each time that a system 10 is accessed. Rather, by entering an account number with a password, an authorized user is recognized and the user is charged for use of system 10 to that account number and then sent an invoice or electronically billed accordingly.

Peripherals listing 160 includes a listing 180 of peripheral input/output devices 26 (FIG. 1) such as a printer, fax, copier, scanner, digital sender and/or other devices available for use with computer workstation 20. A cost 182 is associated for each use of one of peripheral input/output devices 26. Programs listing 162 includes a listing of software applications 186 such as a word processor, spreadsheet program, presentation program, financial program, and/or other software available for use with computer workstation 20 including application service provider software available through network communication link 32. A cost 188 is associated with the use of each program 186. System package listing 166 includes a listing of a group of peripheral input/output devices 26 and/or programs 186 that are offered at a package cost for convenience.

Finally, demonstration function 154 comprises a module that provides a demonstration and/or tutorial to a prospective user on all of the features of system 10, specifically identifying which software applications and input/output devices are available during use of system 10.

Of course, screen saver 62 optionally can provide much less or more information, depending on the type of services provided or the location of the computer system 10. For example, screen saver 62 optionally includes colorful promotional material for attracting the attention of patrons passing by computer system 10.

Figure 3:
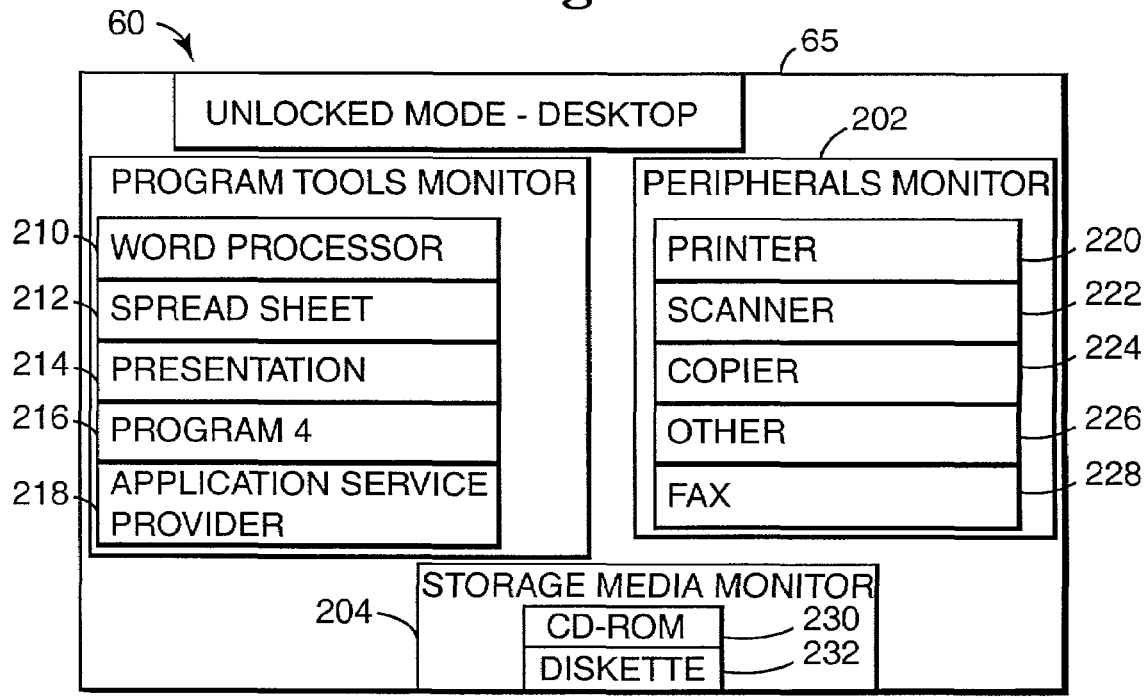
FIG. 3 is a block diagram of an unlocked user interface of a public access computing system, according to one embodiment of the present invention.
Figure 4:
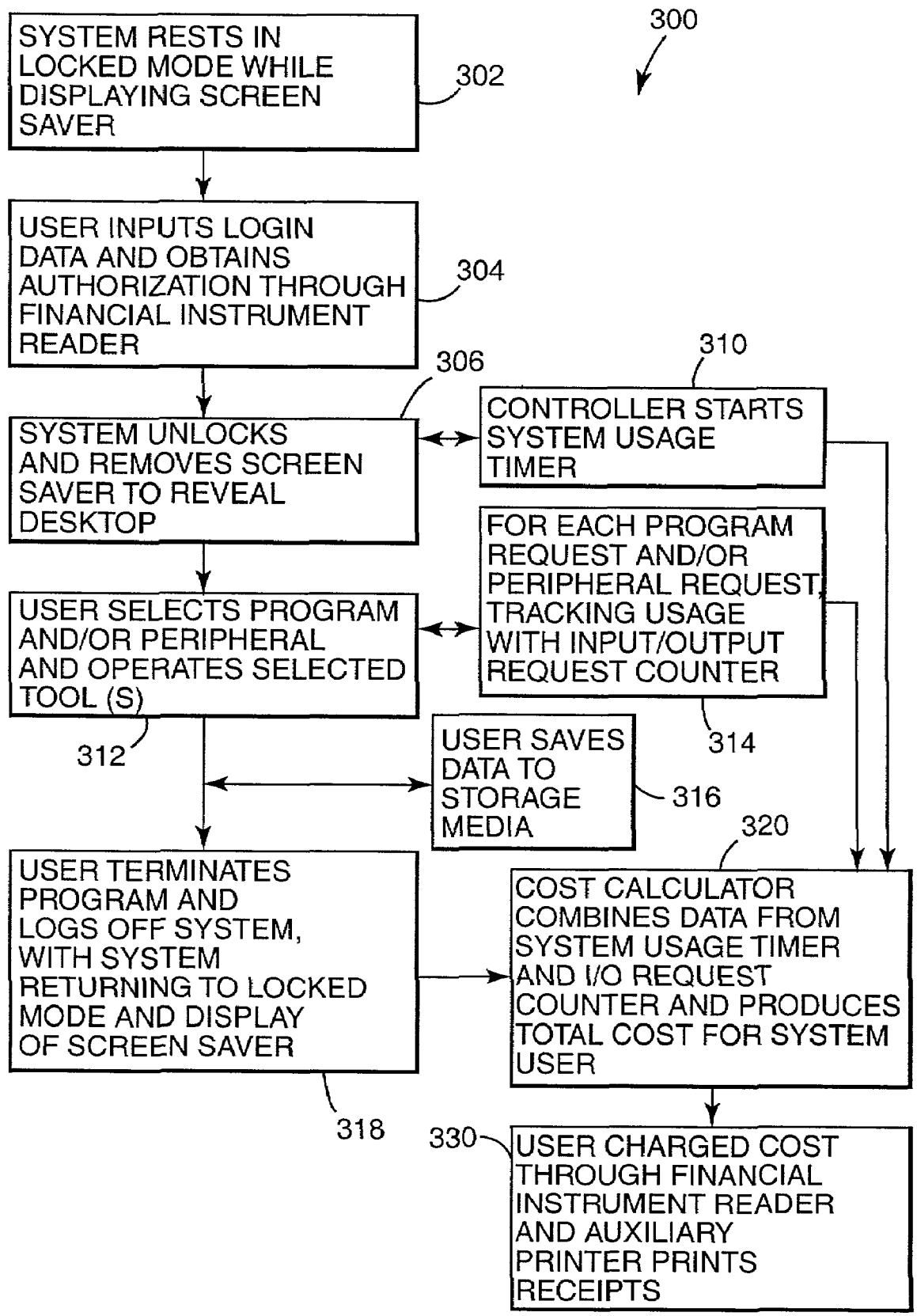
FIG. 4 is a flow diagram of a method of public access computing system, according to one embodiment of the present invention.

As shown in FIG. 3, user interface 60 of display 40 further comprises desktop 65. Desktop 65 displays tools that are available to an authorized user of system 10 and computer workstation 20 when system 10 is in its unlocked mode. Desktop 65 includes program tools monitor 200, peripherals monitor 202, and storage media monitor 204. Program tools monitor 200 includes a set of keyword functions for activating a software application associated with each keyword, such as word processor function 210, spreadsheet function 212, presentation function 214, alternate program function 216, and application service provider 218. Application service provider 218 identifies a software application that is operable in system 10 and that is provided by a service provider through web browser 64 and network communication link 32. The appearance of desktop 65 is not limited to the arrangement shown in FIG. 3. For example, desktop 65 optionally appears as a Windows-based desktop with icons representing keyword functions for activating particular software applications or input/output devices 26.

Peripherals monitor 202 includes a set of keyword functions for activating a peripheral input/output device associated with each keyword, such as printer function 220, scanner function 222, copier function 224, other function 226, and fax function 228. Finally, storage media monitor 204 includes a set of keyword functions for activating a storage media device such as CD read/write drive 230 and disk drive 232 for importing and exporting data to and from system 10 relative to diskette and/or CD.

Storage media monitor 204 optionally is used for temporarily using a software program from a CD or diskette for operation on computer workstation 20. For example, the software program can temporarily fully installed onto computer workstation 20 during the authorized user's use of system 10 and then fully uninstalled from computer workstation 20 as part of the log off process from system 10. Alternatively, the software program is operated from CD read/write drive 230 and/or disk drive 232 with only a minimal number of software components temporarily loaded onto computer workstation 20. Computer workstation 20 optionally includes its own security measures such as anti-virus software to protect itself from malicious hackers and users.

A method 300 of public access computing of the present invention uses system 10 and permits a user to operate computer workstation 20 for accessing software programs in program tools monitor 200 and peripheral input/output devices 26 in peripherals monitor 202. Method 300 includes a first step 302 in which system 10 rests in a locked mode while displaying screen saver 62 on display 60. In the locked mode, computer workstation 20 is up and running but desktop 65 (FIG. 3) including program tools monitor 200 and peripherals monitor cannot be viewed or operated by a user at computer workstation 20. Instead, screen saver 62 (FIG. 2) is provided in place of desktop 65 and merely illustrates what services are available from system 10.

In a next step 304 of method 300, the user enters login information such as a temporary user id or account number, and obtains authorization to pay for services from system 10 with computer workstation 20 through financial instrument reader 22. In particular, a user passes a credit card, debit card, or other electronic financial instrument through financial instrument reader 22, which contacts financial database 24 to verify the user's ability to pay electronically for the services. Upon a successful payment authorization, financial instrument reader 22 sends a signal to computer workstation 20 that the user is financially authorized to use system 10.

In response, the next step 306 of method 300 includes unlocking system 10 and removing screen saver 62 to reveal desktop 65. At the same time, in a related step 310, controller 42 starts system usage timer 70 for tracking the amount of time that user uses system 10.

With desktop 65 (FIG. 3) available to the user, the user then selects a tool(s) such as software program and/or peripheral device by activating one of the listed keyword functions in program tools monitor 200 and/or peripherals monitor 202 and operates those tools (step 312). In a related step (314), for each program request and/or peripheral request, usage is tracked with input/output request counter 74. After or during operation of the tools of system 10, a user saves data from use of the software programs and/or peripheral devices to storage media such as a CD through CD read/write drive 230 or a diskette through disk drive 232 (step 316).

The user then logs off system 10, terminating use of any software programs and/or peripheral devices. This action triggers system 10 to return to a locked mode in which desktop 65 is inaccessible and screen saver 62 appears on user interface 60 of display 40. At this point, resource cost calculator 72 combines data from system usage timer 70 and input/output request counter 74 to produce a total cost for the use of system 10 (step 320). In a final step (330), system 10 charges the user this cost through financial instrument reader 22 and auxiliary printer 30 prints out a receipt for the user. Alternatively, as previously mentioned, system 10 bills the user through an established account associated with the account number entered through login function 150.

A system and method for public access computing of the present invention permits computer users to access their favorite software programs and peripheral devices without having their own computer or devices with them. System 10 conveniently provides a computing system that has all the necessary tools for user and in convenient locations such as airports, retail shopping centers, libraries, etc. The computer user pays for this service through an electronic financial instrument such as a credit card, alleviating the necessity for a supervisor or cashier to manage the computer system 10 and/or receive payment for services.

While specific embodiments have been illustrated and described, herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A selective access computer system comprising:
   a computing workstation having at least one software application and at least one input/output device;
   a selective access mechanism for obtaining electronic payment authorization for a user's financial instrument and for permitting selective access to the computer workstation upon payment authorization for the user, the selective access mechanism including:
      a credit card and bank-issued debit card reader connected to the computing workstation for obtaining payment authorization;
      a resource tracker configured for determining an amount to be charged to the user based on at least one of a total amount of time that the computer system is used and a number of requests to the at least one input/output device of the computer workstation;
   a desktop user interface to enable access, upon receipt of payment authorization, to at least one of:
      a program monitor configured for enabling selection of the at least one software application; and
      a peripheral input/output monitor configured for enabling selection of the at least one input/output device; and
   a screen saver configured for appearing on a display of the computing workstation to prevent access to the desktop user interface of the computing workstation until payment authorization is received, the screen saver including at least one of:
      a tools preview function displayable on the screen saver and configured to identify tools accessible at the computer workstation, the tools including the at least one software application and the at least one input/output device;and
      a price function displayable on the screen saver and configured to identify information regarding prices for using the tools at the computer workstation.

2. The computer system of claim 1 wherein the tools preview function of the screen saver comprises:
   an icon display representing the at least one software application available at the computer system; and
   a demonstration function representing the at least one software application.

3. A selective access computer system comprising:
   a computing workstation having at least one software application and at least one input/output device;
   a selective access mechanism for obtaining electronic payment authorization for a user's financial instrument and for permitting selective access to the computer workstation upon payment authorization for the user, the selective access mechanism including:
      a credit card and bank-issued debit card reader connected to the computing workstation for obtaining payment authorization;
      a resource tracker configured for determining an amount to be charged to the user based on at least one of a total amount of time that the computer system is used and a number of requests to the at least one input/output device of the computer workstation;
   a desktop user interface to enable access, upon receipt of payment authorization, to at least one of:
      a program monitor configured for enabling selection of the at least one software application and comprising: a keyword function menu configured to enable activation of the at least one software application and including at least one of a word processor function, a spreadsheet function, a presentation function, and an application service provider function; and
      a peripheral input/output monitor configured for enabling selection of the at least one input/output device.

4. A selective access computer system comprising:
   a computing workstation having at least one software application and at least one input/output device;

a selective access mechanism for obtaining electronic payment authorization for a user's financial instrument and for permitting selective access to the computer workstation upon payment authorization for the user, the selective access mechanism including:
  a credit card and bank-issued debit card reader connected to the computing workstation for obtaining payment authorization;
  a resource tracker configured for determining an amount to be charged to the user based on at least one of a total amount of time that the computer system is used and a number of requests to the at least one input/output device of the computer workstation;

a desktop user interface to enable access, upon receipt of payment authorization, to at least one of:
  a program monitor configured for enabling selection of the at least one software application; and
  a peripheral input/output monitor configured for enabling selection of the at least one input/output device and comprising: a keyword function menu configured to enable activation of the at least one input/output device and including at least one of a printer function, a scanner function, a copier function, a facsimile function, and a digital sender function.

* * * * *